US012228022B1

(12) United States Patent
Duncan

(10) Patent No.: US 12,228,022 B1
(45) Date of Patent: Feb. 18, 2025

(54) CARBON DIOXIDE CONTROL SYSTEM FOR WELL CONTROL AND PRODUCTION

(71) Applicant: FMC Technologies, Inc., Houston, TX (US)

(72) Inventor: Iain Duncan, Houston, TX (US)

( * ) Notice: Subject to any disclaimer, the term of this patent is extended or adjusted under 35 U.S.C. 154(b) by 0 days.

(21) Appl. No.: 18/506,882

(22) Filed: Nov. 10, 2023

(51) Int. Cl.
*E21B 43/16* (2006.01)
*B01D 53/04* (2006.01)
*F15B 1/04* (2006.01)
*F15B 21/00* (2006.01)

(52) U.S. Cl.
CPC ........ *E21B 43/164* (2013.01); *B01D 53/0415* (2013.01); *F15B 1/04* (2013.01); *F15B 21/00* (2013.01); *B01D 2257/504* (2013.01)

(58) Field of Classification Search
CPC .............. E21B 43/164; B01D 53/0415; B01D 2257/504; F15B 1/04; F15B 21/00
See application file for complete search history.

(56) References Cited

U.S. PATENT DOCUMENTS

| | | | | |
|---|---|---|---|---|
| 4,593,763 A * | 6/1986 | Burke | ........................ | F25D 3/10 166/57 |
| 4,809,510 A * | 3/1989 | Gaspard | ................... | F03B 13/00 416/DIG. 4 |
| 6,648,944 B1 * | 11/2003 | Baker | ................... | B01D 53/225 96/9 |
| 2010/0314136 A1 * | 12/2010 | Zubrin | ................... | E21B 43/168 166/402 |
| 2013/0170910 A1 | 7/2013 | Hoier et al. | | |
| 2013/0255486 A1 * | 10/2013 | Hall | ........................ | B01D 53/24 166/305.1 |
| 2017/0016355 A1 * | 1/2017 | Rost | ........................ | F23J 15/00 |
| 2022/0136783 A1 * | 5/2022 | Smith | ................... | F28D 21/0017 165/297 |
| 2022/0333460 A1 | 10/2022 | Fripp et al. | | |
| 2023/0193791 A1 | 6/2023 | Katterbauer et al. | | |
| 2023/0349267 A1 * | 11/2023 | Hendricks, Jr. | ... | B01F 23/23762 |

FOREIGN PATENT DOCUMENTS

CN 110094188 A 8/2019

OTHER PUBLICATIONS

International Search Report issued in International Application No. PCT/US2024/051437 dated Dec. 16, 2024 (5 pages).
Written Opinion issued in International Application No. PCT/US2024/051437 dated Dec. 16, 2024 (8 pages).

* cited by examiner

*Primary Examiner* — James G Sayre
(74) *Attorney, Agent, or Firm* — Osha Bergman Watanabe & Burton LLP

(57) ABSTRACT

A method for controlling operations at a well site using carbon dioxide includes diverting a portion of carbon dioxide flowing through a main supply line into a slipstream line fluidly connected to the main supply line to create a carbon dioxide slipstream. The method further includes directing the carbon dioxide slipstream to one or more control modules at the well site, and operating equipment associated with an operation at the well site by flowing a portion of the carbon dioxide slipstream via the one or more control modules to the equipment. A related carbon injection system includes an injection tree, a carbon dioxide slipstream, a control module, and a slipstream line fluidly connected to a main supply line. The injection tree is configured to receive a flow of carbon dioxide via the main supply line for injection into a subterranean formation.

20 Claims, 5 Drawing Sheets

CARBON DIOXIDE CONTROL SYSTEM FOR WELL CONTROL AND PRODUCTION

FIELD OF DISCLOSURE

Embodiments disclosed herein relate generally to using carbon dioxide to operate equipment at a well site where the carbon dioxide is sourced from a pipeline transporting the carbon dioxide to an injection well.

BACKGROUND

Carbon dioxide is often injected into a reservoir via one or more injection wells for enhanced oil recovery (EOR) operations and/or for carbon capture and sequestration (CCS) operations. Injection wells are often part of a larger geographically regional field of wells that may also include production wells. Injection and production wells have equipment, such as valves and pumps, that aid in injecting carbon dioxide ($CO_2$) into the reservoir, producing hydrocarbons from the reservoir, and providing well control barriers, to name a few.

This equipment is typically pneumatically or hydraulically driven. That is, the equipment requires power (i.e., external drive power) supplied from compressors, hydraulic power units (HPU), electromechanical (EM) actuating systems, or hybrid actuation systems (HAS). These systems may require supplemental power generation or power supply cables/umbilicals to supply drivers for the systems, which in turn can increase the size and complexity of a well site.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods and systems for controlling operations at a well site using carbon dioxide. A method includes diverting a portion of carbon dioxide flowing through a main supply line into a slipstream line fluidly connected to the main supply line to create a carbon dioxide slipstream, directing the carbon dioxide slipstream to one or more control modules at a well site, and operating equipment associated with an operation at the well site by flowing a portion of the carbon dioxide slipstream via the one or more control modules to the equipment.

A carbon injection system includes an injection tree, a carbon dioxide slipstream, a control module, and a slipstream line. The injection tree is configured to receive a flow of carbon dioxide for injection into a subterranean formation and has one or more actuatable valves to block or allow the flow of the carbon dioxide through the injection tree. The carbon dioxide slipstream is formed by diverting a portion of the flow of carbon dioxide. The control module is operably connected to at least one of the one or more actuatable valves. The slipstream line directs the carbon dioxide slipstream to the control module. The control module is configured to actuate the one or more actuatable valves using the carbon dioxide slipstream.

A system for operating equipment at a well site includes a valve, a pipeline, and a slipstream line. The valve has a pneumatic actuator and operation of the valve operates the equipment at the well site. The pipeline has carbon dioxide flowing therein. The slipstream line directs a portion of the flow of the carbon dioxide from the pipeline to the pneumatic actuator. The pneumatic actuator converts energy from the portion of the flow of the carbon dioxide into motion of the valve.

Other aspects and advantages of the invention will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the shapes of the elements as drawn are not necessarily intended to convey any information regarding the actual shape of the elements and have been selected for ease of recognition in the drawing.

DETAILED DESCRIPTION

Figure 1:
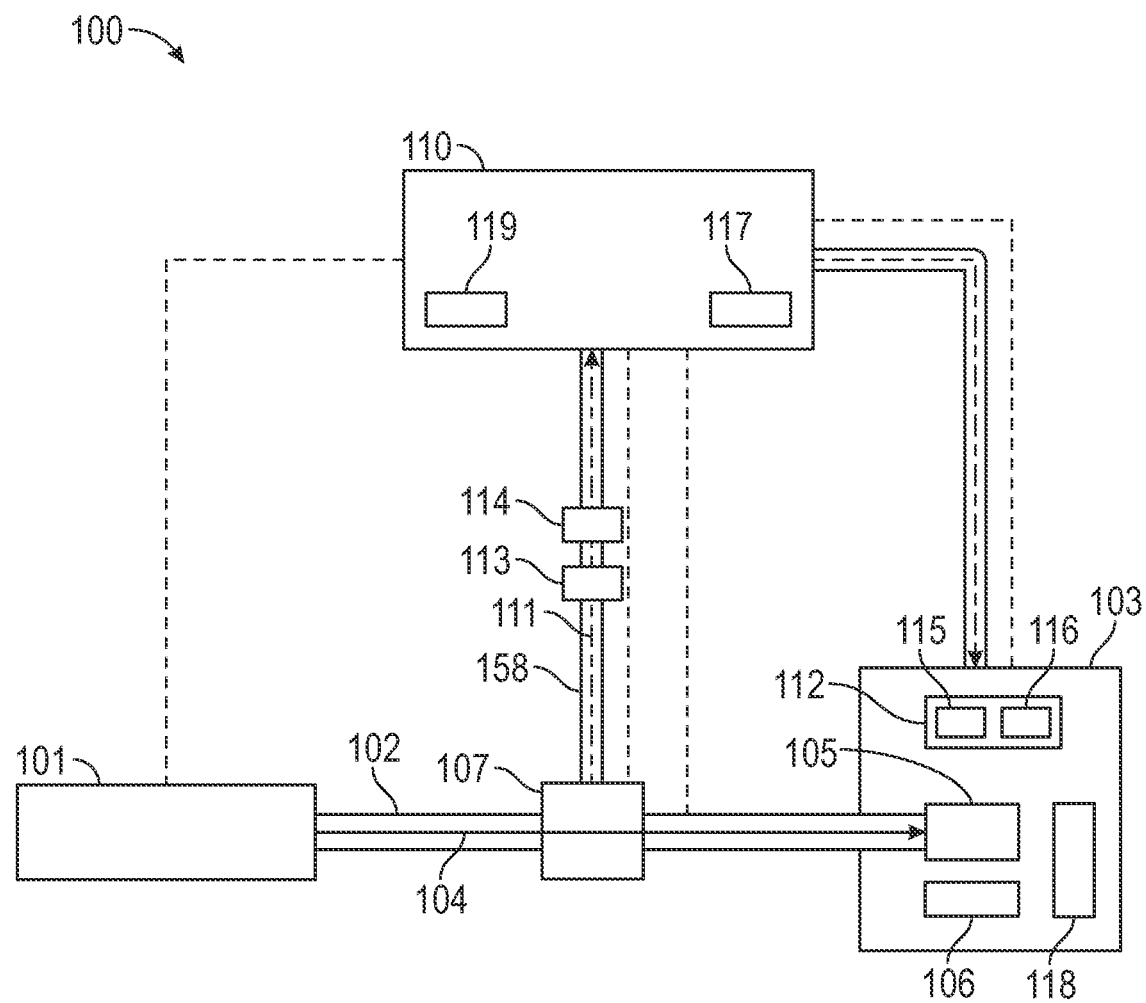
FIG. 1 illustrates a block diagram of an injection system according to one or more embodiments of the present disclosure.

In the following detailed description, certain specific details are set forth to provide a thorough understanding of various disclosed implementations and embodiments. However, one skilled in the relevant art will recognize that implementations and embodiments may be practiced without one or more of these specific details or with other methods, components, materials, and so forth. For the sake of continuity and in the interest of conciseness, the same or similar reference characters may be used for the same or similar objects in multiple figures. As used herein, the term "coupled," "coupled to," "connected," "connected to," "attached," or "attached to" may indicate establishing either a direct or indirect connection and is not limited to either unless expressly referenced as such. As used herein, fluids may refer to slurries, liquids, gases, and/or mixtures thereof. It is to be further understood that the various embodiments described herein may be used in various stages of a well (land and/or offshore), such as rig site preparation, drilling, completion, abandonment, etc., and in other environments, such as work-over rigs, fracking installation, well-testing installation, oil and gas production installation, without departing from the scope of the present disclosure.

Embodiments disclosed herein are directed to methods and systems for powering/operating equipment at a well site using carbon dioxide ($CO_2$) sourced from a pipeline transporting the $CO_2$. A person skilled in the art will appreciate that any operation that uses $CO_2$ sourced from a pipeline transporting the CO2 may be used without departing from the scope of the disclosure herein.

Embodiments disclosed herein are directed to injection systems that utilize a flow of CO2 (e.g., steady state dense phase CO2) to a well site (onshore or offshore) as a driver of well site equipment. For example, the injection system can take a slipstream of CO2 off a main supply line or pipeline of CO2 and deliver the diverted CO2, as a steady state dense phase CO2, to the well site. Subsequently, at the well site, the slipstream of CO2 may be routed to a well control system where the diverted CO2 may be used to drive well control functions, such as a sub-surface safety valve, and associated injection equipment, such as a pump. Accordingly, embodiments disclosed herein may include both a main supply of CO2 and a diverted supply of CO2, where the main supply of CO2 may be transported through a main supply line to be injected into a well for use in a CO2 injection operation, and where the diverted CO2 may be transported through one or more slipstream lines fluidly connecting the main supply line to one or more well control systems to be used as driving fluid for powering well equipment.

Further, injection systems and methods according to one or more embodiments described herein may provide a more efficient alternative to conventional injection systems. For example, one or more embodiments described herein may eliminate the need for power supply cables/umbilicals or an external power drive to control and operate the wellhead valves, tree valves, manifolds, and other associated injection/well control equipment. Overall, injection systems, in accordance with embodiments of the present disclosure, may minimize product engineering, reduce the risk associated with surface equipment, reduce assembly time, and reduce hardware cost. Thus, the disclosed injection systems may improve safety on site and reduce costs associated with conventional injection systems. The embodiments described herein are provided merely as examples of useful applications, which are not limited to any specific details of the embodiments herein.

In accordance with one or more embodiments, the injection systems may include corrosion-resistant (e.g., stainless-steel) equipment in a wellbore to transport the CO2 into subterranean formations for CO2 storage or for EOR operations. In one or more embodiments, the corrosion-resistant equipment may include a tubing string, packers, hydraulic fracturing device (e.g., perforation gun), and/or other devices used in injection operations in the oil and gas industry. Further, injection systems may include surface equipment in fluid communication with the subterranean formations via the wellbore. The surface equipment may include a wellhead (Christmas tree), pumps, tanks, pressure lines, and other devices used in injection operations. One or more pipelines (e.g., forming a main supply line) fluidly connected to a source of CO2 may be used to deliver CO2 to the well for injection into the subterranean formation using surface equipment.

In some implementations, injection systems may divert CO2 to a processing system at a well site from a main supply line (e.g., one or more pipelines used to deliver CO2 into a well) via a CO2 slipstream pipeline. In some embodiments, the processing system may include a control module, which may receive CO2 via a main carbon dioxide receiver and then direct the CO2 through a dryer column. The dryer column may be automatically activated if any moisture is detected in the CO2 flowing therein. The CO2 may then be directed from the dryer column of the manifold module (e.g., via a distribution manifold) to equipment at the well site, where the diverted and processed CO2 may be used as a driver fluid for operating the equipment. The presence of moisture within the diverted CO2 may inhibit proper pressure control and/or lead to deterioration of pneumatic system components. Thus, by processing the diverted CO2 before using the diverted CO2 to operate equipment, the efficiency and performance of the system may be improved.

Turning to FIG. 1, FIG. 1 shows a block diagram in accordance with one or more embodiments. As shown in FIG. 1, an injection system 100 may include a CO2 process plant 101, a pipeline 102 (e.g., forming a main supply line), and a well site 103. The CO2 process plant 101 processes CO2 received from a CO2 source. The CO2 source may be any source known in the art, such as a CO2 reservoir, a facility having emitters with CO2 capture, a byproduct from a production/separation facility, etc.

In accordance with one or more embodiments, the CO2 process plant 101 may include various equipment, such as compressors and dehydrators, to process the received CO2 into a dry steady state dense phase CO2. The dry steady state dense phase CO2 may prevent hydrates from forming in the pipeline 102. The pipeline 102 transports a main CO2 flow 104 (comprising the dry steady state dense phase CO2) from the CO2 process plant 101 to the well site 103. For example, and as shown in FIG. 1, an end of the pipeline 102 may be fluidly coupled to a wellhead 105 (e.g., via an injection manifold) of the well site 103 to inject the main CO2 flow 104 into a subterranean formation 106. Additionally, a pumping station 107 may be coupled to the pipeline 102 to pressurize the main CO2 flow 104 to the well site 103. For example, the main CO2 flow 104 may be pressurized to a range of 2,600 to 2,700 psi for transport to the well site 103. It is further envisioned that the well site 103 may be an onshore or offshore well site without departing from the scope of the disclosure herein.

In accordance with one or more embodiments, the injection system 100 further includes one or more slipstream lines 158 fluidly connecting the pipeline 102 to one or more equipment units. The slipstream lines 158 may be used to selectively (e.g., using one or more valves) divert a CO2 slipstream 111 from the main CO2 flow 104 to the equipment unit(s). FIG. 1 shows the slipstream line 158 diverting the CO2 slipstream 111 from the main CO2 flow 104 being pumped through the pumping system 107. This allows the same pumping system 107 to pressurize the CO2 slipstream 111 or the main CO2 flow 104. In other embodiments, the slipstream line 158 may divert the CO2 slipstream 111 directly from the pipeline 102, and a second pumping system 107 may be located along the CO2 slipstream line 158 to pressurize the CO2 slipstream 111.

The CO2 slipstream 111 may be a secondary stream of CO2 fluid that is diverted, or extracted, from the main flow of CO2 within the pipeline 102 through a slipstream line 158. In accordance with one or more embodiments, the slipstream line 158 may be made of one or more connected pipe segments, flexible hose, and/or other pipe connections. The slipstream line 158 may be fluidly connected to the pipeline 102 carrying the main CO2 flow 104 to the desired location (e.g., the well site 103). In some embodiments, the slipstream line 158 may have an inner diameter less than that of the pipeline 102.

Additionally, the CO2 slipstream line 158 may have one or more flow control devices, such as a valve positioned along its length and/or positioned at the junction between the pipeline 102 and the CO2 slipstream line 158. Such flow control device(s) may be used to control the diversion of the CO2 slipstream 111 (e.g., the amount of CO2 diverted, the flow rate of diverted CO2, etc.) from the pipeline 102. In one or more embodiments, sensors (e.g., flow meters, pressure sensors, temperature sensors, etc.) may also be provided along the pipeline 102 and/or slipstream lines 158 to monitor the flow of CO2.

In accordance with one or more embodiments, an equipment control system 110 is in electronic communication with the CO2 process plant 101, the pipeline 102, the pumping station 107, and/or the well site 103 to control injection operations of the CO2 flow 104. The equipment control system 110 may use the CO2 slipstream 111 taken from the pipeline 102 to control equipment, such as valves and pumps, at the well site 103.

As shown in FIG. 1, the CO2 slipstream 111 may be fluidly connected to the equipment control system 110. In accordance with one or more embodiments, the CO2 slipstream 111 may be pumped through a CO2 receiver 113 and a dryer column 114 prior to entering the equipment control system 110. The dryer column 114 removes moisture from the CO2 slipstream 111. In other embodiments, the dryer column 114 may be a bypassing insurance dryer column 114, which is automatically activated if any moisture is detected in the CO2 slipstream 111 coming from the CO2 receiver 113. This ensures that the slipstream line 158 is transporting a dry CO2 slipstream 111 to the equipment at the well site 103.

The CO2 receiver 113 may be configured to convert the dense phase CO2 slipstream 111 taken from the main CO2 flow 104 in the pipeline 102 to a lighter gas phase CO2 slipstream 111. From the CO2 receiver 113, the converted CO2 gas may flow through a dryer column 114. From the dryer column 114, the CO2 gas may be directed to the equipment control system 110. The equipment control system 110 is configured to direct the CO2 slipstream 111 to selected equipment (such as a valve or a pump) at the well site 103.

FIG. 1 shows the equipment control system 110 directing the CO2 slipstream 111 generally to the well site 103, however a person skilled in the art will appreciate that the well site 103 may have a plurality of diverting slipstream lines 158 hydraulically connecting the slipstream line 158 from the equipment control system 110 to individual pieces of equipment, such as a well control system 112, at the well site 103.

In accordance with one or more embodiments, the well control system 112 may include control modules 115, 116 that are used to physically divert the CO2 slipstream 111 to activate various valves or pumps at the well site 103. The control modules 115, 116 may have any configuration known in the art. For example, the control modules 115, 116 may be manifold blocks having a spool valve design or a compact design with push-pull control buttons. Additionally, the control modules 115, 116 may be activated by voltage solenoids, which are driven by I/O (input/output) drivers within a controller 117 (i.e., a programmable logic controller) of the equipment control system 110. This allows the equipment control system 110 to electronically and remotely open or close parts of the control modules 115, 116, thus, controlling the direction of the flow of the CO2 slipstream 111.

In accordance with one or more embodiments, a first control module 115 may be coupled to equipment at the surface of the well site 103, such as the wellhead 105. The first control module 115 may activate well functions of the well site 103 using the CO2 slipstream 111. Specifically, the first control module 115 may divert CO2 from the CO2 slipstream 111 to valves at the well site 103 to activate the corresponding well function. For example, valves of the wellhead 105 may be fitted with pneumatic actuators that are hydraulically connected to the first control module 115. As such, the CO2 slipstream 111 from the first control module 115 may be supplied to the pneumatic actuators to activate one or more of the valves of the wellhead 105. It is further envisioned that the valves and pneumatic actuators of the well site 103 may be vented to a central receiving system. At the central receiving system, exhausted gas is neutralized by a replaceable set of tandem CO2 absorption cartridges provided in an exhaust gas neutralizer.

A Surface Controlled Sub-Surface Safety Valve (SCSSV) 118 (which may be installed 300-600 feet into the well) of the well site 103 may be controlled using a second control module 116 to preserve a fail-safe function should a shutdown of well operations be required. In accordance with one or more embodiments, the CO2 slipstream 111 may be pumped from the equipment control system 110 to the well control system 112 at the well site 103. The well control system 112 may divert a portion of the CO2 from the CO2 slipstream 111 to the second control module 116. The second control module 116 may be operated by the equipment control system 110, to allow the CO2 to flow to a pneumatically-driven pump. The CO2 may activate the pump to supply the hydraulic pressure required to open the SCSSV 118 and keep the SCSSV 118 open during well operations. In other embodiments, the CO2 may be directed directly from the CO2 slipstream 111 to the SCSSV 118, and the CO2 itself may be used to operate a pneumatic actuator connected to the SCSSV 118. In such embodiments, no hydraulic equipment may be required to operate the SCSSV 118.

In accordance with further embodiments, the functionalities of the first control module 115 and the second control module 116 may be integrated into a single control module. Furthermore, the CO2 slipstream 111 may be provided directly from the equipment control system 110 to the single control module. Thus, the well control system 112, as described in FIG. 1, may not be needed. In some embodiments, additional control modules may be used at the well site to direct CO2 from the CO2 slipstream 111 to other well site equipment. For example, if two or more wellheads are positioned at a well site, and the main CO2 injection supply is connected to each wellhead via a manifold, a control module may be used to control pneumatically actuated valves on the manifold to allow or isolate the flow of CO2 to the individual wellheads.

With respect to the equipment control system 110, the equipment control system 110 may include hardware and/or software (such as a controller 117 and a user interface 119) that facilitates the opening and closing of valves at the well site 103, such as valves in the control modules 115, 116. The hardware and/or software may also control/monitor the functionalities of the CO2 slipstream 111 processing (such as the CO2 receiver 113 and the dryer column 114). Additionally, sensors may be included on various components of the injection system 100 to collect and transmit data to the equipment control system 110 and the well control system 112. These sensors may be used to relay the status of various valves at the well site 103 and along the slipstream lines 158 to the equipment control system 110. The sensors may also be used to monitor the flow rate of the slipstream 111 at various locations.

Figure 2:
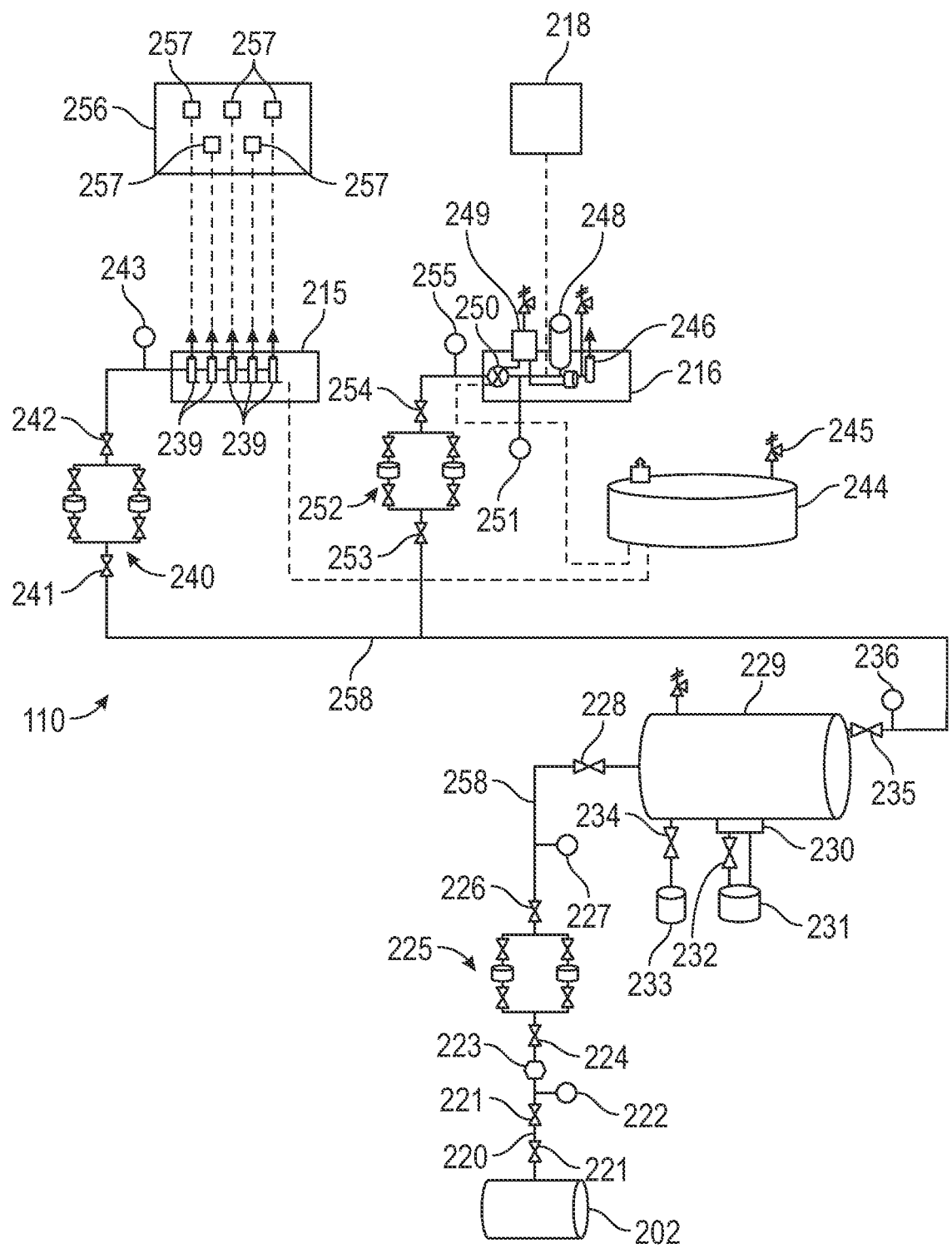
FIG. 2 illustrates a schematic diagram of an equipment control system according to one or more embodiments of the present disclosure.

FIG. 2 illustrates a schematic diagram of an exemplary carbon injection system according to aspects of the present disclosure. As depicted, the carbon injection system comprises an injection tree 256, an SCSSV 218, a pipeline 202, a slipstream line 258, one or more control modules 215, 216 operably connected to the injection tree 256 and SCSSV 218, and slipstream equipment (described below) connected to the pipeline 202 and the one or more control modules 215, 216. Although not pictured, a main flow of $CO_2$, such as the main $CO_2$ flow 104 shown in FIG. 1, is flowing through the pipeline 202, and a $CO_2$ slipstream, such as the $CO_2$ slipstream 111 shown in FIG. 1, is flowing through the $CO_2$ slipstream line 258.

In one or more embodiments, the $CO_2$ slipstream may be established by diverting a portion of $CO_2$ off the pipeline 202. The $CO_2$ slipstream is diverted via the slipstream line 258. The $CO_2$ may be transported to the injection tree 256 along the pipeline 202 for injection or introduction into a subterranean formation. In certain embodiments, the slipstream equipment provided along the slipstream line 258 may comprise a takeoff manifold block 220 that is fluidly coupled to the pipeline 202 to provide an inlet for the $CO_2$ slipstream to be diverted from the pipeline 202. Additionally, the takeoff manifold block 220 may include a plurality of valves 221. In some implementations, the plurality of valves 221 are bleed valves that can maintain a pressure from the pipeline 202 to the slipstream line 258. The slipstream equipment may further comprise a first pressure sensor 222 to measure a pressure downstream of the takeoff manifold block 220. For example, the pressure may be maintained by the plurality of valves 221 to about 5,000 psi, and the first pressure sensor 222 can be used in confirming the pressure. As shown, a flow meter 223 may be used to measure the flow rate of the $CO_2$ slipstream through the slipstream line 258. Downstream of the flow meter 223, a valve 224 may be used to control the main flow rate of the $CO_2$ through the slipstream line 258.

As shown in FIG. 2, downstream of the valve 224, the slipstream equipment may include a first dual pressure regulator assembly 225. For example, the pressure in the slipstream line 258 may be reduced to a range of 250 to 2,500 psi via a series of valves and tanks of the first dual pressure regulator assembly 225. A second valve 226 is downstream of the first dual pressure regulator assembly 225 to control a flow exiting the dual first pressure regulator assembly 225. Further, a second pressure sensor 227 is used to measure the pressure of the $CO_2$ leaving the first dual pressure regulator assembly 225.

Downstream of the first dual pressure regulator assembly 225, a main $CO_2$ receiver 229 is coupled to the slipstream line 258 to provide consistent pressure regulation using two pressure regulators in sequence. A third valve 228 may be used to control a flow into the main $CO_2$ receiver 229. The main $CO_2$ receiver 229 may be sized based on the number of trees that the slipstream line 258 is fluidly coupled to. The main $CO_2$ receiver 229 includes an accumulator 230 to be used in a water detection system in the slipstream line 258.

If water is detected, the accumulator 230 may be automatically opened (i.e., valve 232 is operated) to transport the wet $CO_2$ into a dryer column 231. The dryer column 231 will dry the wet $CO_2$ to remove moisture and then return the $CO_2$ dry back to the main $CO_2$ receiver 229. This ensures that the slipstream line 258 is transporting a dry $CO_2$ slipstream to the corresponding trees. Additionally, the main $CO_2$ receiver 229 may also have a secondary storage tank 233 to store any excess $CO_2$. For example, a valve 234 may be opened to store any excess $CO_2$ in the secondary storage tank 233. Additionally, downstream of the main $CO_2$ receiver 229, a valve 235 may be provided to control a flow rate of the $CO_2$ leaving the main $CO_2$ receiver 229. Further, a pressure sensor 236 may measure the $CO_2$ leaving the main $CO_2$ receiver 229. For example, the pressure may be maintained by the valve 235 to about 300 psi, and the pressure sensor 236 can be used to confirm this.

In one or more embodiments, the slipstream line 258 is fluidly coupled to one or more control modules 215, 216 from the main $CO_2$ receiver 229. In accordance with one or more embodiments, the control modules 215, 216 each include a manifold having one or more outlets and intlets. The manifold inlet allows the $CO_2$ slipstream to flow from the slipstream line 258 to the manifold. A control valve (not pictured) may be located at each outlet of the manifold. The control valves may comprise solenoid valves that open and close in response to control signals from an equipment control system, such as the equipment control system 110 shown in FIG. 1. The control valve controls the flow of $CO_2$ out of the manifold outlet. In accordance with one or more embodiments, the first control module 215 may direct $CO_2$ to pneumatic actuators 239 associated with the injection valves 257 of an injection tree 256.

In accordance with one or more embodiments, each manifold outlet in the first control module 215 is associated with a pneumatic actuator 239 that actuates one of the injection tree valves 257. The pneumatic actuator 239 actuates the injection tree valve 257 by converting the energy in the form of the compressed $CO_2$ into the motion of the injection tree valve 257. As such, when an injection tree valve 257 within an injection tree 256 must be moved from one position to another, the control valve may open to allow $CO_2$ from the manifold to reach the associated pneumatic actuator 239 coupled to the injection tree valve 257. The control valves may be electrically powered control valves that respond to electrical control signals to selectively place the associated actuator in communication with the $CO_2$ manifold.

While embodiments disclosed herein describe using the first control module 215 to actuate injection tree valves 257 on an injection tree 256, it is to be understood that the first control module 215, or any subsequent control module, may be used to operate any valve on a well site. For example, a control module, operating similarly to the first control module 215 may operate valves on a production tree or on other manifolds/trees associated with nearby well operations, such as drilling, fracking, completion, and workover operations.

Upstream of the first control module 215, a second dual pressure regulator assembly 240 may be provided to reduce a pressure in the slipstream line 258 before the $CO_2$ enters the first control module 215. For example, the pressure in the slipstream line 258 may be reduced to a range of 40 to 100 psi via a series of valves and tanks of the second dual pressure regulator assembly 240. Additionally, a valve 241 may be used upstream of the second dual pressure regulator assembly 240 to control a flow of $CO_2$ into the second dual pressure regulator assembly 240.

Further, another valve 242 may be provided downstream of the second dual pressure regulator assembly 240 to control a flow exiting the second dual pressure regulator assembly 240. A pressure sensor 243 can be used to measure a pressure, leaving the second dual pressure regulator assembly 240. For example, the pressure of the $CO_2$ entering the first control module 215 can be measured by the pressure sensor 243 to confirm the range of 40 to 100 psi. If the pressure is outside of this range, the valve 242 can be closed until the pressure is within the corresponding range.

In accordance with one or more embodiments, the first control module 215 may be vented to a $CO_2$ vent absorption unit in a central receiving system 244. The $CO_2$ vent absorption unit may be sized based on the number of trees fluidly coupled to the CO2 vent absorption unit. For example, a back end of each pneumatic actuator 239 may be fluidly coupled to the central receiving system 244 to allow exhaust gas from the CO2 actuating each pneumatic actuator 239 to be vented to the CO2 vent absorption unit. Additionally, the CO2 vent absorption unit may include a plurality of replaceable CO2 absorption cartridges to neutralize the exhausted gas. After the exhausted gas is neutralized, a vent 245 of the CO2 vent absorption unit may be opened to release the clean gas into the atmosphere.

In accordance with one or more embodiments, a second control module 216 may be used to drive a SCSSV 218 with the CO2 from the CO2 slipstream flowing through the slipstream line 258. The SCSSV 218 may be similar to or the same as the SCSSV 118 outlined in FIG. 1. The second control module 216 may control a hydraulic pump 250 pneumatically driven by CO2 from the CO2 slipstream. The hydraulic pump 250 may be coupled to a hydraulic reservoir 249 and a piston drive accumulator 248. When the hydraulic pump 250 is activated by CO2 from the slipstream line 258, the hydraulic pump 250 may receive hydraulic fluid from the hydraulic reservoir 249 and direct pressurized hydraulic fluid to the accumulator 248. The accumulator 248 may, in turn, be in fluidic communication to a hydraulic actuator 246 operably associated with the SCSSV 218 to actuate the SCSSV 218. It is further envisioned that a pressure sensor 251 may be provided in the second control module 216 to monitor a pressure of the hydraulic fluid.

Upstream of the second control module 216, a third dual pressure regulator assembly 252 may be provided to reduce a pressure in the slipstream line 258 before the CO2 enters the second control module 216. For example, the pressure in the slipstream line 258 may be reduced to a range of 100 to 150 psi via a series of valves and tanks of the third dual pressure regulator assembly 252. Additionally, a valve 253 may be used upstream of the third dual pressure regulator assembly 252 to control a flow of CO2 into the third dual pressure regulator assembly 252. Another valve 254 can be provided downstream of the third dual pressure regulator assembly 252 to control a flow exiting the third dual pressure regulator assembly 252. A pressure sensor 255 can be used to measure a pressure leaving the third dual pressure regulator assembly 252.

As shown in FIG. 2, the second control module 216 may be vented to the CO2 vent absorption unit in the central receiving system 244. For example, a back end of the hydraulic pump 250 is fluidly coupled to the central receiving system 244, via a central fitting, to allow exhaust gas from the CO2 actuating the hydraulic pump 250 to be vented to the CO2 vent absorption unit.

Figure 3:
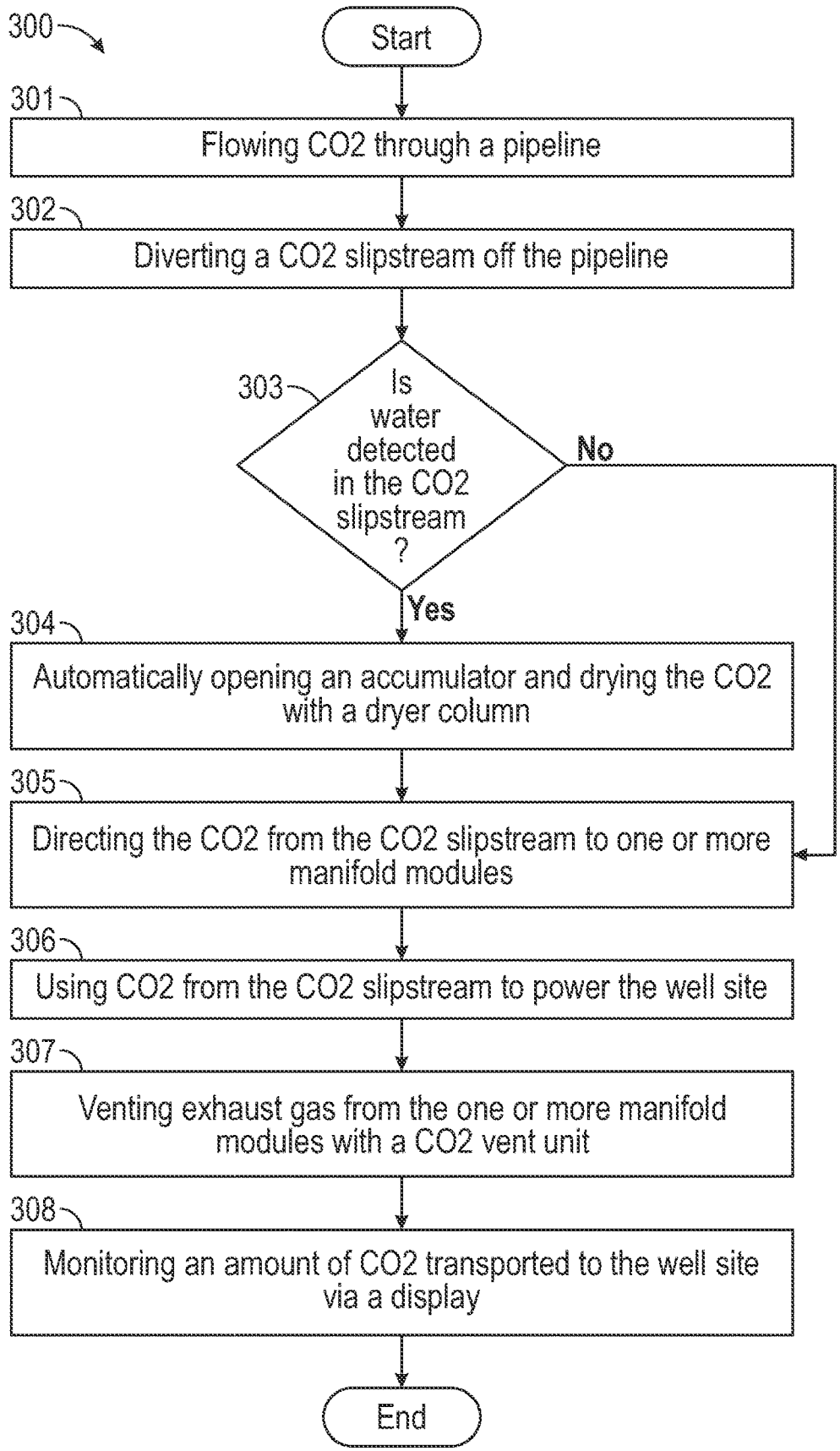
FIG. 3 is a flow chart of a method according to one or more embodiments of the present disclosure.

FIG. 3 is a flowchart showing a method 300 for operating equipment at a well site (such as the well site described in FIGS. 1 and 2) according to embodiments of the present disclosure. In some implementations, one or more blocks in FIG. 3 may be performed by one or more components (e.g., a computing system coupled to a controller in communication with the devices at the well site). For example, a non-transitory computer-readable storage medium may store instructions on a memory coupled to a processor such that the instructions include functionality for conducting one or more steps used to operate the equipment. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 301, CO2 flows through a main supply pipeline. In accordance with one or more embodiments, the pipeline is fluidly coupled to a CO2 process plant to receive a dry steady state dense phase CO2. The dry steady state dense phase CO2 flows through the pipeline to a well site fluidly coupled to a distal end of the pipeline. In some embodiments, the dry steady state dense phase CO2 in the pipeline may be pressurized to a range of 2,600 to 2,700 psi for transport. At the well site, the dry steady state dense phase CO2 may be injected into a subterranean formation. In accordance with one or more embodiments, the CO2 may be injected into the formation for any reason known in the art, such as CO2 sequestration or EOR operations.

In Block 302, a CO2 slipstream is branched off the pipeline. The CO2 slipstream may be diverted through a slipstream line. In accordance with one or more embodiments, a main takeoff block of the CO2 slipstream line is fluidly coupled to the pipeline to stream off CO2. Additionally, a pressure in the CO2 slipstream line may be reduced by a dual pressure regulator assembly to be lower than a pressure in the pipeline. For example, the pressure in the CO2 slipstream line may be reduced to a range of 250 to 2,500 psi.

In Block 303, a main CO2 receiver of the CO2 slipstream line detects if there is water in the CO2 (i.e., wet CO2). If no water is detected, the method continues to Block 304, where the CO2 is directed to one or more control modules. However, if water is detected, the method moves to Block 304.

In Block 304, an accumulator is automatically opened to transport the wet CO2 into a dryer column to dry the wet CO2. The dryer column dries the wet CO2 to remove moisture and then returns the dry CO2 back to the main CO2 receiver. This ensures that the CO2 slipstream line is transporting a dry CO2, and the method continues to Block 305.

In Block 305, the CO2 is directed to one or more control modules fluidly coupled to the well site. The one or more control modules may be coupled to a wellhead of the well site.

In Block 306, the CO2 is used to power the well site via the one or more control modules. For example, the one or more control modules may be actuated by voltage solenoids powered by the CO2. Additionally, the one or more control modules directs the power received from the CO2 to the corresponding well operations. For example, the CO2 from the slipstream is sent to associated control equipment in order to control the functions required to manage the corresponding well operations.

In Block 307, exhaust gases from the one or more control modules are vented with a CO2 vent unit. For example, a back end of one or more control modules is fluidly coupled to the CO2 vent unit to allow exhaust gas from the CO2 actuating the one or more control modules to be vented to the CO2 vent unit. Additionally, a plurality of replaceable CO2 absorption cartridges in the CO2 vent unit neutralize the received exhausted gas. After the exhausted gas is neutralized, a vent of the CO2 vent unit may be opened to release the clean gas into the atmosphere.

In Block 308, an amount of CO2 being transported to the well site is monitored with a display. Blocks 301-308 may be repeated until a predetermined amount of CO2 has been used at the wellsite. For example, the predetermined amount of CO2 may correspond to an amount CO2 being injected into and filling the subterranean formation for storage or for the EOR operation. Once the subterranean formation is filled to the specifications required for the operation, an alert may be sent to the display to stop well operations.

Figure 4:
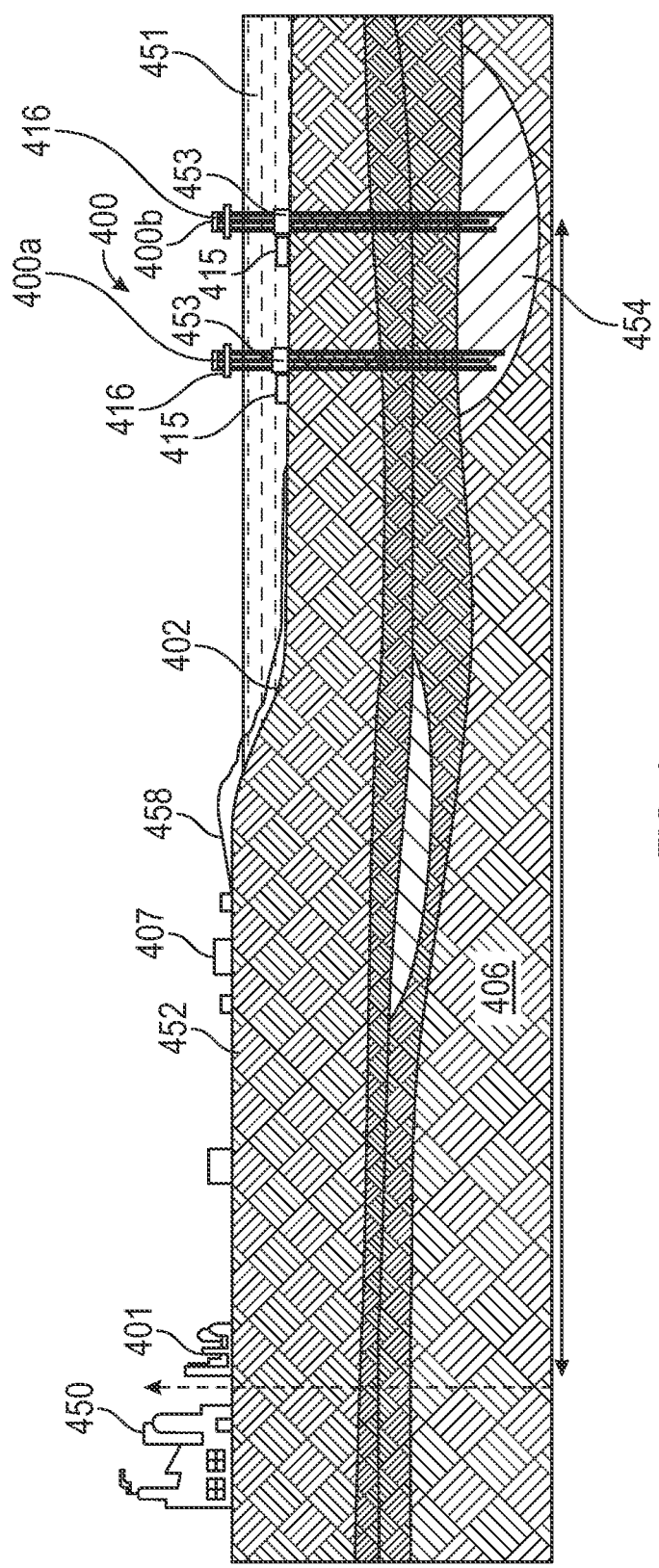
FIG. 4 shows examples of an injection operation at a well site implementing the method of FIG. 3 according to one or more embodiments of the present disclosure.

Now referring FIG. 4, in one or more embodiments, FIG. 4 illustrates a system of implementing the method described in the flowchart of FIG. 3 at a well site 400. As shown in FIG. 4, an example well site 400 is shown, in accordance with embodiments of the present disclosure. The example well site 400 may be an offshore rig. It should be noted, however, various other types and configurations of wells may be used with injection operations including onshore drilling operations, according to embodiments of the present disclosure.

$CO_2$ from a $CO_2$ source 450 is sent to a $CO_2$ process plant 401 for processing. The $CO_2$ process plant 401 may include various equipment, such as compressors and dehydrators, to process the captured $CO_2$ to form a dry steady state dense phase $CO_2$. In the dry steady state dense phase $CO_2$, hydrates will not form in a main supply pipeline 402. The pipeline 402 transports the dry steady state dense phase $CO_2$ as a main supply $CO_2$ from the $CO_2$ process plant 401 to the well site 400.

As shown in FIG. 4, the pipeline 402 may be fluidly coupled to a first offshore platform 400a and a second offshore platform 400b of the well site 400 in a body of water 451. For example, a pumping station 407 may be coupled to the pipeline 402 on land 452 to be an onshore to offshore transition point. The pumping station 407 may pressurize the pipeline 402 to transport the $CO_2$ to each of the first offshore platform 400a and the second offshore platform 400b.

In one or more embodiments, the pipeline 402 may be coupled to a corresponding subsea injection tree 453 of each of the first offshore platform 400a and the second offshore platform 400b. From the subsea injection tree 453, the $CO_2$ may be injected into a subterranean formation 406. For example, the subterranean formation 406 may include a storage reservoir 454 to receive the injected $CO_2$ for permanent storage or for EOR operations.

In some embodiments, a $CO_2$ slipstream line 458 diverting a $CO_2$ slipstream from the pipeline 402 is used to control the injection operations and other well operations at the well site 400. For example, the $CO_2$ slipstream line 458 is branched from the pipeline 402 and may run adjacent to the pipeline 402 to fluidly couple to each the first offshore platform 400a and the second offshore platform 400b. The dry steady state dense phase $CO_2$ in the $CO_2$ slipstream line 458 may be processed using components along the $CO_2$ slipstream line 458 (e.g., using a main $CO_2$ receiver, a dryer, one or more accumulators, and/or a flow control device). The diverted and processed $CO_2$ may be used to drive well control functions and associated injection equipment, e.g., by using the diverted $CO_2$ as pneumatic fluid to power one or more valves or other components.

As outlined in FIGS. 1 and 2, in some embodiments, diverted $CO_2$ may be used to power pneumatic actuators 239 in order to actuate the valve associated with the pneumatic actuator. As an example, the $CO_2$ slipstream line 458 may be fluidly coupled to a corresponding subsea control module 415 or a corresponding surface control module 416 of each of the first offshore platform 400a and the second offshore platform 400b. The corresponding subsea control module 415 and the surface control module 416 may be similar to or the same as the first control module 115, 215/second control module 116, 216 outlined in FIGS. 1 and 2.

In accordance with one or more embodiments, the subsea control module 415 may be in fluidic communication with the slipstream line 458 and one or more pneumatic actuators of one or more injection tree valves on the subsea injection tree 453. Thus, the subsea control module 415 may direct the $CO_2$ to the pneumatic actuator associated with the valve on the subsea injection tree 453 to power the pneumatic actuator and open or close the associated valve. The subsea control module 415 may also be in fluidic communication with any other valve or pneumatically actuated equipment located on the sea floor, such as wellhead valves, to actuate said components without departing from the scope of the disclosure herein.

In accordance with one or more embodiments, the surface control module 416 may be in fluidic communication with the slipstream line 458 and a hydraulic pump, not pictured. The hydraulic pump may be located on the first offshore platform 400a and/or the second offshore platform 400b and may be used to actuate a SCSSV, not pictured. In further embodiments, the surface control module 416 may be in fluidic communication with the slipstream line 458 and any other pneumatic actuators associated with any valve located on the first offshore platform 400a and/or the second offshore platform 400b. As such, the surface control module 416 may be used to power the pneumatic actuator to operate the valves.

In accordance with one or more embodiments, the pneumatic actuators of the tree valves, pneumatic actuators of the wellhead, or the pneumatically actuated hydraulic pump may be vented to a central receiving system. At the central receiving system, exhausted gas can be neutralized by a replaceable set of tandem $CO_2$ absorption cartridges.

Figure 5:
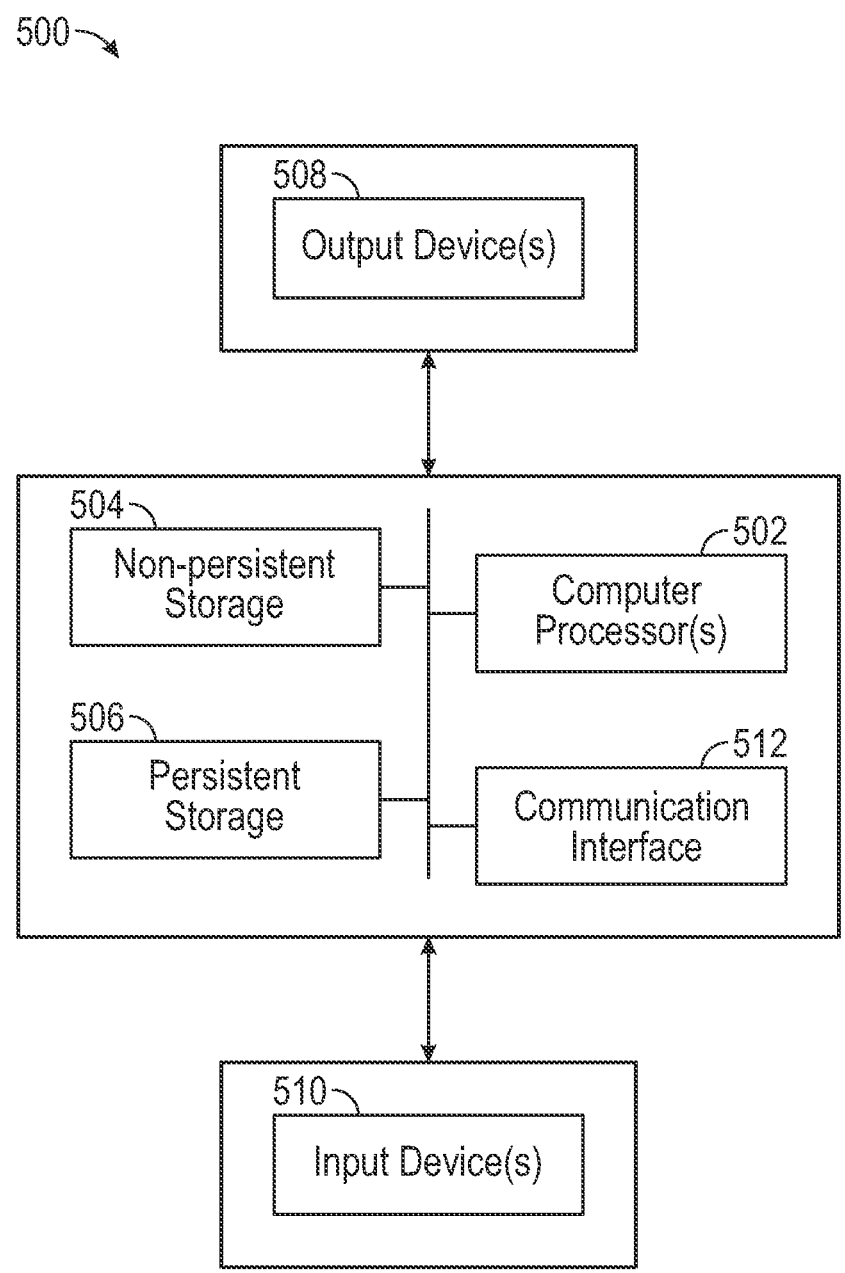
FIG. 5 is a schematic diagram of a computing system according to one or more embodiments of the present disclosure.

Implementations herein for operating the injection system may be implemented on a computing system coupled to a controller in communication with the various components of the injection system. Any combination of mobile, desktop, server, router, switch, embedded device, or other types of hardware may be used with the injection system. For example, as shown in FIG. 5, the computing system 500 may include one or more computer processors 502, non-persistent storage 504 (e.g., volatile memory, such as random access memory (RAM), cache memory), persistent storage 506 (e.g., a hard disk, an optical drive such as a compact disk (CD) drive or digital versatile disk (DVD) drive, a flash memory, etc.), a communication interface 512 (e.g., Bluetooth interface, infrared interface, network interface, optical interface, etc.), and numerous other elements and functionalities. It is further envisioned that software instructions in a form of computer-readable program code to perform embodiments of the disclosure may be stored, in whole or in part, temporarily or permanently, on a non-transitory computer-readable medium such as a CD, DVD, storage device, a diskette, a tape, flash memory, physical memory, or any other computer-readable storage medium. For example, the software instructions may correspond to computer-readable program code that, when executed by a processor(s), is configured to perform one or more embodiments of the disclosure.

The computing system 500 may also include one or more input devices 510, such as a touchscreen, keyboard, mouse, microphone, touchpad, electronic pen, or any other type of input device. Additionally, the computing system 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing systems exist, and the input and output device(s) may take other forms.

The computing system 500 of FIG. 5 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model. For example, a GUI may first obtain a notification from a software application requesting that a particular data object be presented within the GUI. Next, the GUI may determine a data object type associated with the data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the data object and render a visual representation of the data values within a display device according to the designated rules for that data object type.

Data may also be presented through various audio methods. Data may be rendered into an audio format and presented as sound through one or more speakers operably connected to a computing device. Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

In addition to the benefits described, the injection system and methods disclosed herein may improve an overall efficiency and performance of carbon dioxide (CO2) storage operations or EOR operations in a subterranean formation while eliminating the need for power supply cables/umbilicals or external power drives. Additionally, the injection systems and methods disclosed herein may reduce the use of electricity at the well site. Further, the injection system and methods disclosed herein may provide further advantages such as decreasing emissions of CO2 into the atmosphere.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
 diverting a portion of carbon dioxide flowing through a main supply line into a slipstream line fluidly connected to the main supply line to create a carbon dioxide slipstream;
 directing the carbon dioxide slipstream to one or more control modules at a well site; and
 operating equipment associated with an operation at the well site by flowing a portion of the carbon dioxide slipstream via the one or more control modules to the equipment.

2. The method of claim 1, further comprising detecting water in the carbon dioxide slipstream via a main carbon dioxide receiver.

3. The method of claim 1, further comprising reducing a pressure in the slipstream line to be lower than a pressure in the main supply line.

4. The method of claim 1, further comprising actuating the one or more control modules via voltage solenoids to flow the portion of the carbon dioxide slipstream to the equipment.

5. The method of claim 1, further comprising directing the carbon dioxide via the one or more control modules to power corresponding well injection equipment for an injection operation.

6. The method of claim 1, further comprising venting exhaust gases from the one or more control modules with a carbon dioxide vent unit.

7. The method of claim 6, wherein venting the exhaust gases further comprises:
 fluidly coupling a back end of the one or more control modules to the carbon dioxide vent unit to flow the exhaust gases to the carbon dioxide vent unit;
 neutralizing the exhaust gases with a plurality of replaceable CO2 absorption cartridges in the carbon dioxide vent unit to create a neutralized gas; and
 opening a vent of the carbon dioxide vent unit to release the neutralized gas into an atmosphere.

8. The method of claim 1, further comprising flowing a dry steady state dense phase carbon dioxide through the main supply line.

9. The method of claim 1, wherein the operation at the well site is an injection operation and the injection operation comprises pumping carbon dioxide from the main supply line through a tree into a subterranean formation.

10. The method of claim 1, wherein operating equipment associated with the operation at the well site using the portion of the carbon dioxide slipstream via the one or more control modules comprises actuating one or more valves at the well site using the portion of the carbon dioxide slipstream.

11. The method of claim 10, wherein actuating the one or more valves at the well site using the portion of the carbon dioxide slipstream comprises pneumatically actuating the one or more valves using the portion of the carbon dioxide slipstream.

12. The method of claim 10, wherein actuating the one or more valves at the well site using the portion of the carbon dioxide comprises pneumatically driving a hydraulic pump with the portion of the carbon dioxide slipstream to pressurize hydraulic control fluid to actuate the one or more valves at the well site using the pressurized hydraulic control fluid.

13. A carbon injection system, comprising:
 an injection tree configured to receive a flow of carbon dioxide for injection into a subterranean formation, the injection tree having one or more actuatable valves to block or allow the flow of the carbon dioxide through the injection tree;
 a carbon dioxide slipstream formed by diverting a portion of the flow of carbon dioxide;
 a control module operably connected to at least one of the one or more actuatable valves; and a slipstream line directing the carbon dioxide slipstream to the control module, wherein the control module is configured to actuate the one or more actuatable valves using the the carbon dioxide slipstream.

14. The carbon injection system of claim 13, wherein the control module comprises:
   a manifold with an inlet that receives the carbon dioxide slipstream and an outlet associated with only one valve of the actuatable valves; and
   a control valve between the manifold outlet and the actuatable valve to control fluid communication between the manifold and the actuatable valve.

15. The carbon injection system of claim 13, wherein the control module comprises:
   a hydraulic pump driven by the carbon dioxide slipstream,
   a hydraulic fluid reservoir fluidly connected to the hydraulic pump,
   a hydraulic accumulator fluidly connected to the hydraulic pump, and
   a control valve between the hydraulic accumulator and the actuatable valve to control fluid communication between the hydraulic accumulator and the actuatable valve.

16. The carbon injection system of claim 13, further comprising a carbon dioxide vent unit fluidly connected to the at least one control module and comprising a plurality of replaceable CO2 absorption cartridges.

17. The carbon injection system of claim 13, wherein the slipstream line comprises a takeoff manifold block provided at an inlet to the slipstream line, wherein the takeoff manifold block is fluidly connected between a main supply line and the slipstream line, and wherein the takeoff manifold block comprises at least one valve.

18. The carbon injection system of claim 13, wherein the slipstream line comprises at least one pressure sensor and at least one flow meter.

19. The carbon injection system of claim 13, wherein the slipstream line comprises a dual pressure regulator assembly comprising a series of valves and tanks configured to reduce a pressure of the carbon dioxide slipstream within the slipstream line.

20. A system for operating equipment at a well site, the system comprising:
   a valve having a pneumatic actuator, wherein operation of the valve operates the equipment at the well site;
   a pipeline having carbon dioxide flowing therein; and
   a slipstream line directing a portion of the flow of the carbon dioxide from the pipeline to the pneumatic actuator, wherein the pneumatic actuator converts energy from the portion of the flow of the carbon dioxide into motion of the valve.

* * * * *